(12) United States Patent
Fioratti

(10) Patent No.: US 8,206,201 B2
(45) Date of Patent: Jun. 26, 2012

(54) WORKING SYSTEM USING BRUSH TOOL

(75) Inventor: Stefano Fioratti, Brescia (IT)

(73) Assignee: Tenax SpA, Volargne Verona (IT)

( * ) Notice: Subject to any disclaimer, the term of this patent is extended or adjusted under 35 U.S.C. 154(b) by 0 days.

(21) Appl. No.: 10/962,581

(22) Filed: Oct. 13, 2004

(65) Prior Publication Data
US 2005/0107017 A1     May 19, 2005

(30) Foreign Application Priority Data

Oct. 14, 2003 (IT) .............................. VR2003A0117
Feb. 17, 2004 (IT) .............................. VR2004A0020

(51) Int. Cl.
B24D 11/00    (2006.01)

(52) U.S. Cl. .......... 451/526; 51/295; 51/298; 264/328.8

(58) Field of Classification Search .................... 51/298, 51/295, 299, 300; 264/330, 328.8; 451/526, 451/530, 446
See application file for complete search history.

(56) References Cited

U.S. PATENT DOCUMENTS

| | | | |
|---|---|---|---|
| 3,618,154 A | 11/1971 | Muhler et al. | |
| 5,174,795 A | 12/1992 | Wiand | |
| 5,679,067 A | 10/1997 | Johnson et al. | |
| 5,737,794 A * | 4/1998 | Barber et al. | 15/229.12 |
| 5,788,900 A | 8/1998 | Warner et al. | |
| 6,261,156 B1 * | 7/2001 | Johnson et al. | 451/41 |
| 6,352,471 B1 * | 3/2002 | Bange et al. | 451/527 |
| 6,902,399 B2 * | 6/2005 | Mannschedel | 433/141 |
| 2002/0065031 A1 * | 5/2002 | Chou et al. | 451/466 |
| 2002/0132572 A1 * | 9/2002 | Lageson et al. | 451/526 |
| 2004/0112400 A1 * | 6/2004 | Kurek | 132/218 |
| 2004/0185762 A1 * | 9/2004 | Turch et al. | 451/490 |
| 2005/0107017 A1 * | 5/2005 | Fioratti | 451/526 |

FOREIGN PATENT DOCUMENTS

| | | |
|---|---|---|
| JP | 2000-152822 A | 6/2000 |
| WO | WO-96/33638 A1 | 10/1996 |

* cited by examiner

Primary Examiner — Jacob K Ackun, Jr.
(74) Attorney, Agent, or Firm — Orum & Roth LLC

(57) ABSTRACT

A method of producing a brush for carrying out surface roughing, polishing, lapping, and smoothing operations comprises a first molding operation of one or more mixes including one or more moldable synthetic materials so as to obtain a base portion (6; 160) and a plurality of bristle members (3; 130, 130a, 130b) projecting from a surface (6a; 160a) of the base portion (6; 160) and including at least one abrasive material. The invention also relates to a brush tool of synthetic material including one or more abrasive grain material in the bristle members (3; 130, 130a, 130b) thereof.

17 Claims, 5 Drawing Sheets

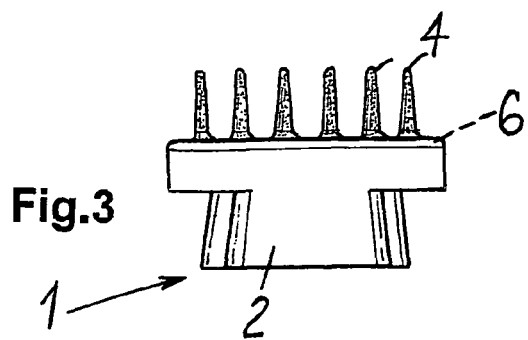
Fig.3
Fig.2
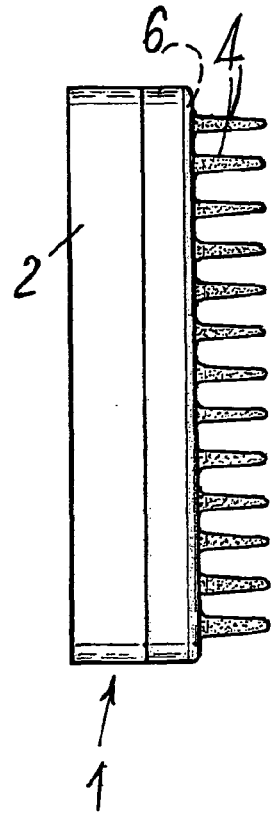
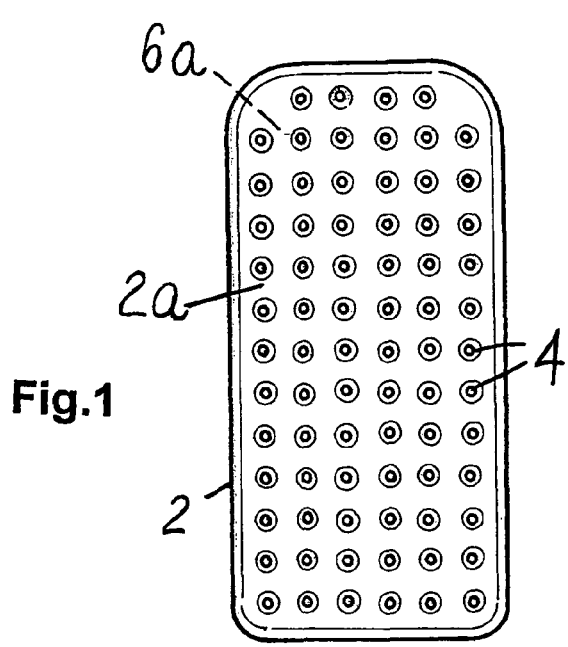
Fig.1
Fig.6
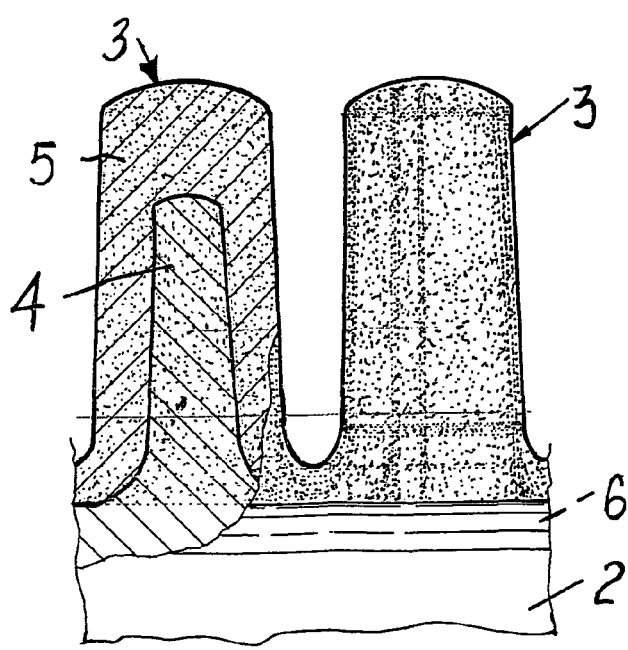

Fig.7
Fig.8
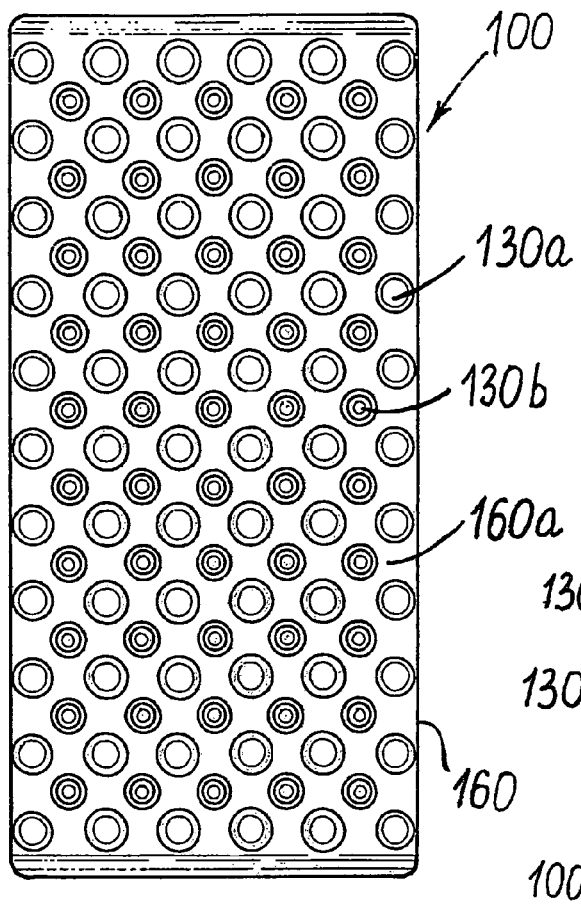
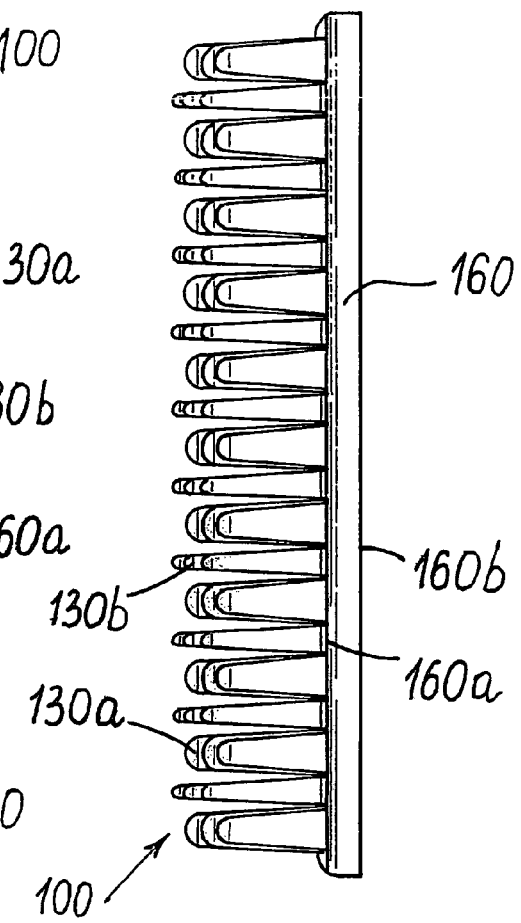
Fig.9
Fig. 10
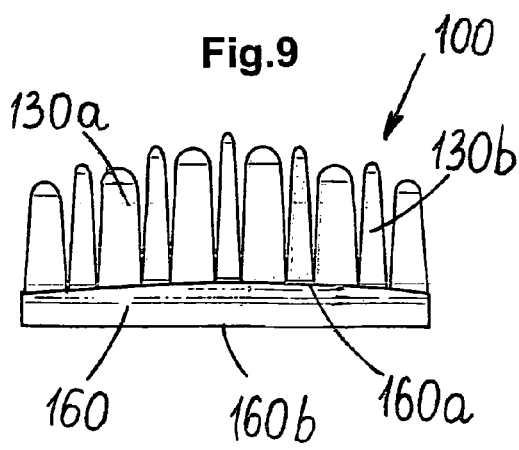
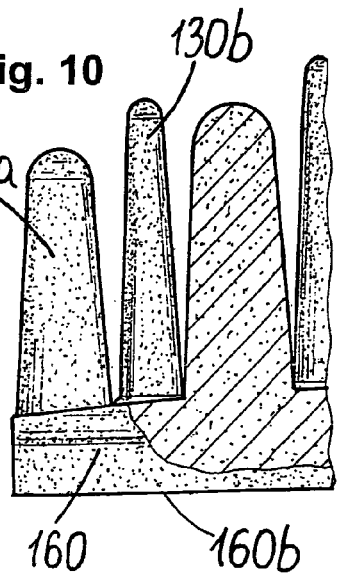

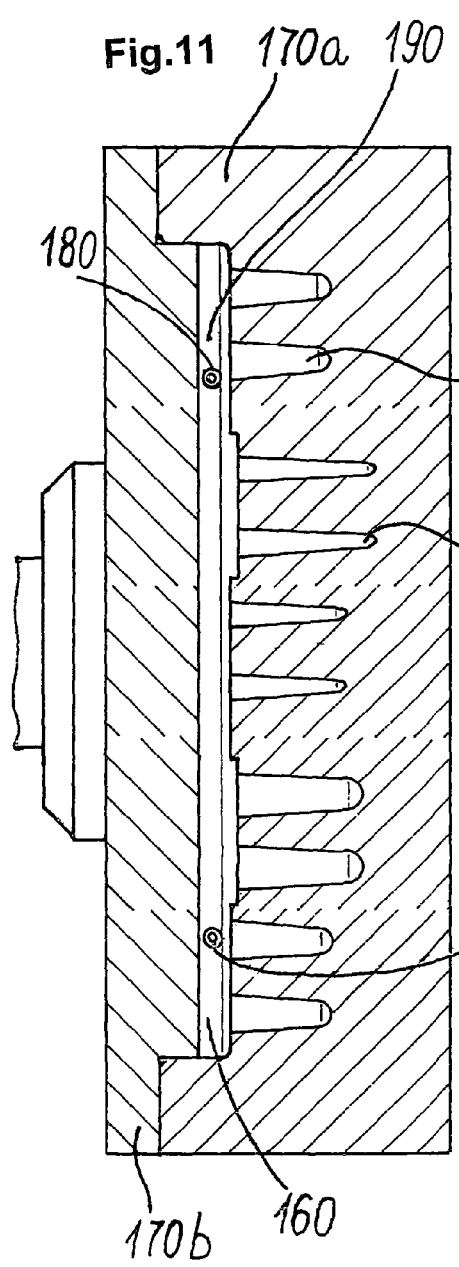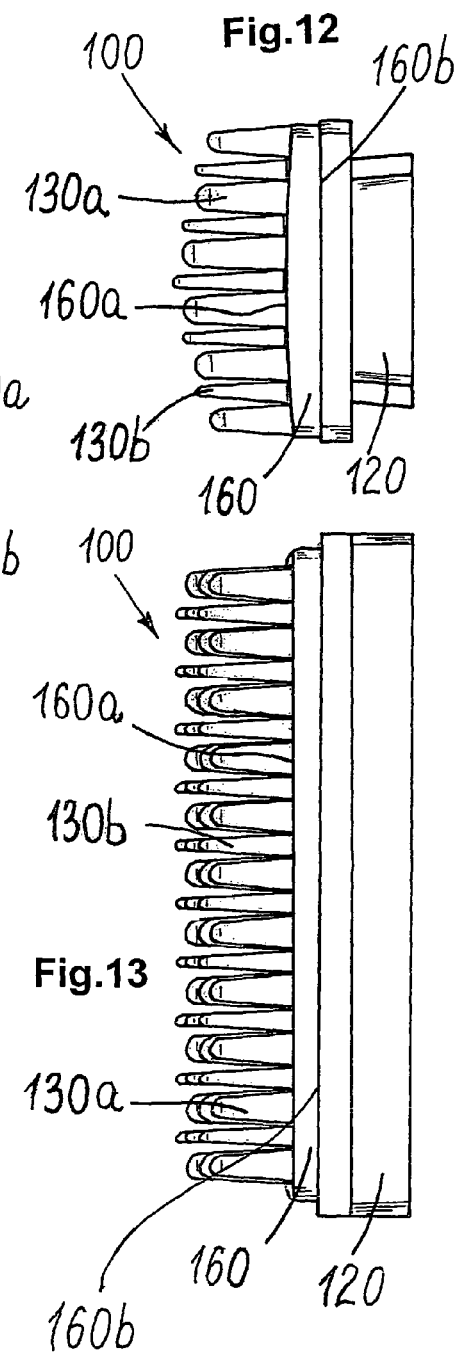

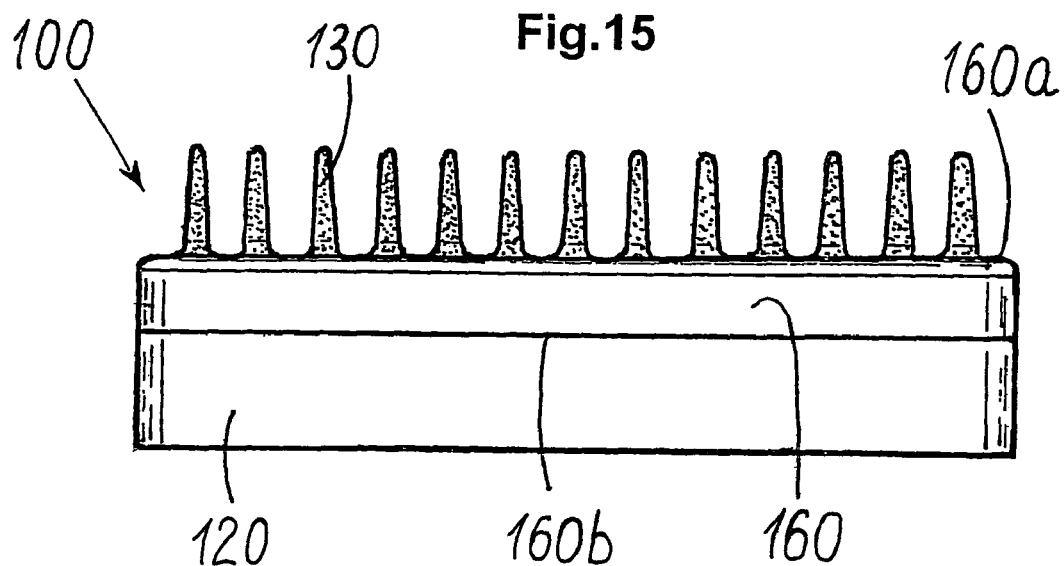
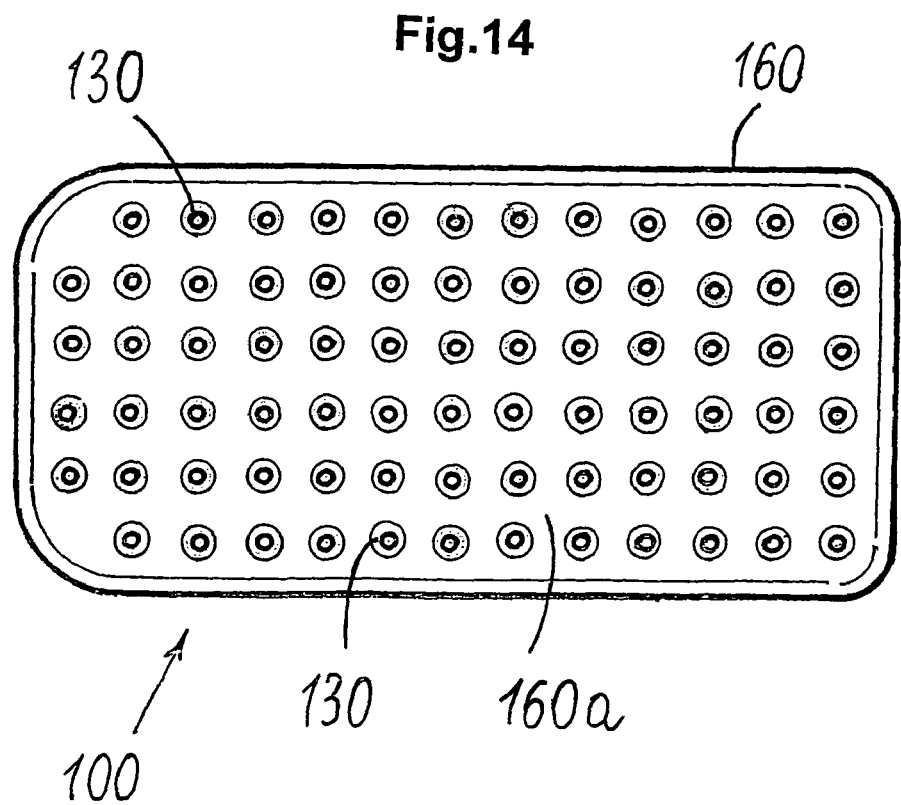

WORKING SYSTEM USING BRUSH TOOL

This Nonprovisional application claims priority under 35 U.S.C. §119(a) on Patent Application No(s). VR2003A000117 & VR2004A000020 filed in Italy on Oct. 14, 2003 & Feb. 17, 2004; respectively, the entire contents of which are hereby incorporated by reference.

FIELD OF THE INVENTION

The present invention concerns a working system using a brush tool, particularly, but not exclusively, suitable for working and/or finishing natural and artificial stone materials.

As it is well-known, a number of brush tools have already been proposed for working, such as roughing, polishing, lapping and smoothing, stone materials, e.g. tools:
- with flexible bristles each formed by a multiplicity of various synthetic material fibers carried by an attachment socket or base, and
- a so-called "tortoiseshell" block, i.e. having a working portion of sintered abrasive material having a plurality of raised sectors, small portions or tesserae, obtained by hot pressing in a suitable mould, a support socket or base portion, and an intermediate portion comprising one or more layers of an elastically deformable material, e.g. rubber, placed between the working and the socket portions.

Flexible bristle brush tools, as known in the art, are problematic in use because uneven bristle wear and frequent bristle detachment from the attachment base can occur, and thus they are subject to become quickly clogged which prevents a working liquid (water) from flowing through them to remove the stone shavings.

The so-called "tortoiseshell" tools have the drawback of being practically rigid in a direction parallel to the working plane, while permitting a limited working elasticity only in an orthogonal direction thereto. Thus, while a stone material is being worked the tool withstands and easily supports any force acting in a direction normal to the abrasive tool, but is unaffected, in practice, by any lateral forces, which results in both unsatisfactory working of the stone material and an uneven wear on the small abrasive blocks of the brush tool.

Moreover, a tortoiseshell tool has difficulties in adapting itself to a superficial corrugated profile, e.g. having depressions and relieves, owing to its poor elasticity in a transversal direction, as it is the case with artificial stone or ceramic materials, i.e. when aging aesthetic effects are to be obtained. Thus, a tortoiseshell tool can be normally used almost exclusively in the finishing of almost flat surfaces.

SUMMARY OF THE INVENTION

The main object of the present invention is to provide a novel working system using one or more brush tools suitable for working uneven surfaces of natural and artificial stone materials, and for eliminating or drastically reducing the above-mentioned drawbacks.

Another object of the present invention is to provide a brush-shaped working tool that is easy to use on flat and uneven surfaces and can be produced at highly competitive manufacturing costs.

According to a first aspect of the present invention, there is provided a method for producing a surface roughing, polishing, lapping, and smoothing brush, comprising:
- a first injection moulding of a mixture including at least one mouldable synthetic material in a mould, to obtain a base portion of a brush and a plurality of bristle portions projecting from at least one surface of said base portion; and
- second injection moulding onto said bristle members, including a solution or a emulsion of a least one granular abrasive material dispersed in a matrix containing at least one thermoplastic resin to obtain bristle members having a layered structure including a core and an abrasive coating layer.

Advantageously, the plurality of bristle members can comprise bristle members having at least two different orders of size, thereby obtaining a different relative flexibility amongst bristle members of different size having a respective capacity of removing material from a working piece.

According to another aspect of the present invention, there is provided a brush tool comprising a base portion of a mouldable synthetic material and a plurality of bristle members projecting from at least one surface of said base portion, integral with said base portion, and including abrasive material dispersed therein.

In a first embodiment, the brush tool presents a base portion, a plurality of bristle members projecting from said base portion and forming a core or dummy bristle in a first synthetic mouldable material, and a coating cover for each core, said coating cover consisting of a second synthetic mouldable material including at least one abrasive material dispersed therein, whereby obtaining bristle members with a layered structure having a core or dummy bristle. This solution makes it possible both to control the flexibility of the bristle members, it being possible to provide a core of a more or less rigid material, and to save abrasive material usually quite expensive as it can be provided only in the coating cover layer on each bristle member.

Advantageously, the base portion can be both shaped as a socket or can be secured to a support socket member suitable for acting as an attachment component to a tool head of a tool machine, thereby allowing brush working operations to be carried out by using a machine.

Once the brush has been moulded with its own support socket member and its respective plurality of bristles either integral with the socket member or in separate components that are then fixed together in any suitable way, e.g. by glueing or partial melting, it is possible to coat, e.g. through an heat injection moulding process, the bristles, which then act as cores or dummy bristles, with a coating cover consisting of a second thermoplastic synthetic material including at least one abrasive material dispersed therein and preferably at least one filling particle material or filler, fibers or the like. The second material can be the same as said first material, but is preferably different from it and has different toughness and flexibility characteristics, depending upon the bristle behaviour characteristics when working materials which differ in nature, structure, superficial finishing, and the like from one another.

Preferably, the cores or dummy bristles comprise a suitable synthetic mouldable material selected from the group comprising olefin polymers, styrene or vinyl chloride or vinyl acetate copolymers, polyvinyl ether, polyacrylate resins, linear polyamides, mixed polyamides and polyamine products, polyamides (PA), polymethacrylamide, polyamide-imide, polyether-imide, thermoplastic polyurethane polymers, crystallizing PA masses, amorphous polyamides, flexible PA copolymers, flexible thermoplastic polyurethane elastomers (TPU), polyolefins, such as polyethylene, ethylene, polipropylene, polybutylene-1, polymethylpentene copolymers or styrene polymers, vinyl chloride polymers, such as PVC, fluoridised polymers, plastic poly(meta)acrylic materials, PMMA (polymethylmethacrylate) moulding masses, polycarbonate, polyalkylene terephthalates (PTP), polyarylates, oxides-sulfides (PPS)-linear sulforic polyacrylics, polyphenyleneoxide mod. (PPO), polyarylethere (ketone, polysulfones (PEEK)) and mixtures thereof.

The core coating cover with a second thermoplastic mouldable material can comprise a thermoplastic resin, such as polyamide (Nylon® 6), polypropylene (PP) or polyphenylene sulfide (PPS), or a mixture of thermoplastic resins which ensure a suitable toughness and stiffness.

The abrasive material is dispersed or suspended in the resin or mixture of thermoplastic resins and, preferably, comprises: grains of silicon carbide (60 mesh), dark red corundum (60 mesh), tungsten carbide (75-150 micron), diamond (100-120 mesh), whereas the filling material or filler preferably comprises glass fiber, talc, stainless steel 316L powder (400 mesh). Other suitable abrasive materials are also boron carbide, white corundum, aluminium oxides (aluminas), chromium corundum, quartz, silica and metallic grits, e.g. including at least one of the following metal materials: steel, bronze, copper, cobalt, magnesium, tungsten, and titanium.

The invention is further described and illustrated by its following embodiments, which are given only by way of indicative and non limiting examples of the scope of the invention.

Example 1

A brush tool according to the present invention was prepared, which had support socket member and bristle cores integral with the socket, socket and cores consisting of Nylon 6 filled with 20% glass fibers, whereas the core coating cover consisted of Nylon 6 filled with 20% glass fibers and 10% (60 g) silicon carbide (CSi).

Example 2

A brush tool according to the present invention was prepared, which had support socket member and bristle cores integral with the socket, socket and cores consisting of Nylon 6 filled with 20% glass fibers, whereas the core or dummy bristles coating cover consisted of Nylon 6 filled with dark red corundum (60 g).

Example 3

A brush tool according to the present invention was prepared, which had support socket member and bristle cores integral with the socket, socket and cores consisting of polypropylene (PP) filled with 10% talc, whereas the core coating cover consisted of Nylon 6 filled with 10% silicon carbide (60 g).

Example 4

A brush tool according to the present invention was prepared, which had support socket member and bristle cores integral with the socket, socket and cores consisting of polyphenylene sulfide (PPS) filled with glass fibers and 5% stainless steel 316L powder (400 mesh), whereas the outer coating cover consisted of Nylon 6 filled with 5% silicon carbide (60 g), and 5% 75-150 micron tungsten carbide.

Example 5

A brush tool according to the present invention was prepared, which had support socket member and bristle cores integral with the socket, socket and cores consisting of polyphenylene sulfide (PPS) filled with glass fibers and 5% stainless steel 316L powder (400 mesh), whereas the outer coating cover consisted of Nylon 6 filled with 4.7% diamond (100-120 mesh).

Tests were carry out on four tiles (30×30 cm) of each of the following material: Verona red marble, Africa black granite, resin-quartz agglomerate (artificial stone) and corrugated surface ceramic.

Tests were aimed at establishing the degree of deformability after use of the plurality of artificial bristles according to the present invention and the removal effectiveness as measured by the loss of weight of the tiles after a brush working operation. To carry out such tests, a commercially available polishing machine having a 135 mm tool head with a feed rate of 800 mm/min was used, which was provided with brushes according to the invention designed as floating sectors (as it conventional in granite smoothing). The peripheral rotation speed was about 12 m/sec with a cooling liquid (water) fed at a rate of 20 liters/min. The working pressure on the brushes was at about 2.5 bar.

As a reference brush, a brush with bristles consisting of DuPont Tynex® containing abrasive with 60 mesh grain size was used.

Test results are shown in the following Table I

TABLE I

|  | DuPont Tynex ® | Example 1 | Example 2 | Example 3 | Example 4 | Example 5 |
|---|---|---|---|---|---|---|
| Verona red marble |  |  |  |  |  |  |
| Weight loss g: | 10.2 | 8.6 | 9.1 | 11.3 | 18.1 | 6.2 |
| Appearance: | unchanged | unchanged | unchanged | unchanged | unchanged | unchanged |
| Africa black granite |  |  |  |  |  |  |
| Weight loss g: | 3.2 | 1.5 | 1.7 | 4.2 | 3.3 | 3.1 |
| Appearance: | slightly deformed in the rotation direction | unchanged | integral | integral | integral | integral |
| Quartz resin agglomerate |  |  |  |  |  |  |
| Weight loss g: | 2.2 | 2.2 | 1.7 | 2.9 | 2.9 | 2.7 |
| Appearance: | slightly deformed in the rotation direction | unchanged | unchanged | unchanged | unchanged | unchanged |
| Corrugate |  |  |  |  |  |  |

TABLE I-continued

|  | DuPont Tynex ® | Example 1 | Example 2 | Example 3 | Example 4 | Example 5 |
|---|---|---|---|---|---|---|
| surface ceramic | | | | | | |
| Weight loss g: | 1.9 | 2.0 | 1.7 | 2.2 | 2.2 | 2.1 |
| Appearance: | deformed in the rotation direction | unchanged | unchanged | unchanged | unchanged | unchanged |

Tests have shown that a smaller deformation of brush tools according to the invention has occurred and this results in many cases in a greater removal capability and effectiveness, which obviously makes it possible to increase, if required, the working load or pressure on the brush tool with consequent increase in the removal capacity and working speed.

In another embodiment, the brush tool has a base portion and a plurality of bristle members integral with the base portion, the base portion and the bristle members being obtained in one injection moulding step of an injection mouldable material including grains of at least one abrasive material dispersed therein.

Advantageously, as described above, the injection mouldable material is a thermoplastic mouldable material, typically at least one thermoplastic resin, including at least one granular abrasive material and at least one particulate filling component or filler.

Also in this case, the brush tool according to the present invention is intended to be secured to a support socket member, e.g. a sector of 14 or 17 cm, of so-called Frankfurt, cassani or genoese types or screw engagement rolls and the like, as it is known to a person skilled in the art, to be assembled onto a tool head of manually or automatically operating roughing, polishing, smoothing, lapping machines, and the like.

The fixing system between the support socket member and the brush tool can be of various types, e.g. a system using bonding agents, Velcro®, partial melting, ultrasound welding, and the like.

Example 6

A brush tool according to the present invention was prepared, both the base portion or socket and the bristles consisting of Nylon 6 filled with 20% silicon carbide (CSi) (60 mesh) and 2% industrial diamond (100-120 mesh).

Example 7

Four sets of brush tools according to the present invention with different grain size (120, 220, 300, 400 mesh) were prepared consisting of Nylon 6 (80% by weight) filled with silicon carbide (18.4% by weight) and industrial diamond (1.6% by weight).

Example 8

Four sets of brush tools with different grain size (120, 220, 300, 400 mesh) were prepared consisting of Nylon 6 with a very high resilience elastomer, i.e. Nevimid® 6 MLD E800 provided by Nevicolor a Luzzara—Reggio Emilia—Italy—(80% by weight) filled with silicon carbide (18.4% by weight) and 100/120 mesh industrial diamond (1.6% by weight).

With reference to Example 6, tests on four 30×30 tiles of each of the following material were carry out: Verona red marble, Africa black granite, resin-quartz agglomerate (artificial stone) and corrugated surface ceramic (structural ceramic), using the same procedure and the same polishing machine as previously described, but having different working parameters, such as peripheral speed of about 12 m/sec and cooling liquid (water) feed of 20 liters/min. Working pressure on the brushes was about 2.5 bar.

As a reference brush, a brush with bristles consisting of DuPont Tynex® containing abrasive with 60 mesh grain size was used.

Test results are shown in the following Table II

TABLE II

|  | DuPont Tynex ® | Example 6 |
|---|---|---|
| Verona red marble | | |
| Weight loss | 10.2 | 10 |
| Appearance | unchanged | unchanged |
| Africa black granite | | |
| Weight loss | 3.2 | 3.3 |
| Appearance | Slightly deformed in the rotation direction | unchanged |
| Resin-quartz agglomerate | | |
| Weight loss | 2.2 | 2.9 |
| Appearance | Slightly deformed in the rotation direction | unchanged |
| Corrugated surface ceramic | | |
| Weight loss | 1.9 | 2.2 |
| Appearance | Slightly deformed in the rotation direction | unchanged |

The tests carried out have shown a smaller deformation of the "bristles" in the brush tool according to the present invention and this results in a greater capacity or effectiveness of removing surface material, which obviously makes it possible to increase, if required, the working load or pressure on the brush tool, with consequent increase in the removal capacity and working speed.

With reference to the test carried out according to Example 7, a working sequence (smoothing and polishing operations) as above described has been carried out on Grès ceramic material.

Tests were aimed at establishing the degree of deformation and wear in the used artificial bristles and the brushing depth in the brushed material according to the present invention.

Tests were carried out on 45 cm wide tile material using a commercially available continuous cycle polishing machine having a conveyor belt moving at a feed rate of 7.3 m/min and using a 135 mm tool head provided with six oscillating sectors arranged at a uniform angular distance from one another (as it is conventional in granite smoothing machines). Each oscillating sector has a seat arranged to locate a respective brush tool. A brush tool for each of four grains size (mesh) was used. The tests were carried out at a peripheral speed of about 12.5 m/sec, a cooling liquid (water) being fed at a rate of 25 liters/min and no working pressure was applied to the tool head acting on the Grès material, while taking advantage only of the tool head weight of 85 kg.

Moreover, tests were carried out with brush tools having alternate arrays of bristles different in size so as to have bristles with different flexibility in the various bristle arrays.

As a result, a working tool was obtained having a good working stress strength owing to the presence of thicker bristles, whereby ensuring a good capacity of removing material, although not too rigid at the same time so as to make it possible for the thinner bristles to be slightly flexible. During the oscillating motion of the brush tools, the thicker and thus much more rigid bristles entered into contacted with the working surface in a discontinuous manner, while carrying out a relatively consistent removal of material from the working surface, whereas the thinner and thus much more flexible bristles removed material to a much lesser extent than the thick bristles. However, owing to their yielding nature the thinner bristles did cause a "brushing" effect, i.e. they acted upon a surface greater than that of the working end of each bristle, thereby obtaining an excellent overall smoothing and polishing effect of the brush tool.

As reference sample a commercially available tortoiseshell brush tool was used, as briefly described at the beginning of the present description.

Test has shown that the working quality of the brush tool of the Example 7 is such that no visible faults, e.g. halos or scratches, are detected on the work piece, and this can be obtained by carrying out only four smoothing runs, instead of seven runs generally needed when using tortoiseshell tools.

An overall much smaller and uniform wear degree on the entire working surface of each brush tool than that in tortoiseshell tool was noted. Moreover, it was found that wear correspondingly decreased from 120 to 400 grain size.

Two sets of tests were carried out, using brush tools according to Example 8, to check the influence on the working results when using in both cases the same thermoplastic material, but with bristles having different dimensional configuration.

The same polishing machine as that used in the previous example and the same working material, i.e. structured "Grès", were used, although the bristle configuration was changed. More specifically:

in a first configuration, designed by "A", relatively thick bristles arranged in parallel arrays and alternate with bristle arrays of smaller size (at least half);
in a second configuration, designed by "B", bristles of only one size were used, more particularly using bristles having smaller size than in configuration "A". See Table III

TABLE III

|  | A | B |
| --- | --- | --- |
| Bristle sizes | 2 | 1 |
| Worked depression diameter [mm] | <10 | <5 |
| Depression depth [mm] | 1 | 0.5 |

In both cases, worked material was free of halos or scratches, and thus of optimum working quality. Wear degree of two used tools was within conventional polishing working standards.

These tests show that the brush tool obtained by an injection moulding process according to the present invention has greater versatility in carrying out various working types than conventional tools, bearing in mind that one can act both on the dimensions and location of the bristles and types of materials used in the mouldable thermoplastic material of which the bristles are made.

BRIEF DESCRIPTION OF THE DRAWINGS

Further features and advantages of the present invention will better appear from the following detailed description of presently preferred embodiments of brush tools, given by way of non-limiting examples of carrying out the invention, with reference to the accompanying drawings, in which:

FIG. 1 is a top schematic view of a support socket provided with a plurality of cores or dummy bristles to obtain a brush tool according to the present invention;

FIG. 2 is a side view of the support socket shown in FIG. 1;

FIG. 3 illustrates a view from below of the support socket shown in FIG. 1;

FIG. 6 shows a detail on an enlarged scale of the brush of FIG. 5;

FIG. 7 is a top diagrammatic view of a brush tool of another embodiment according to the present invention;

FIG. 8 is a lateral view of the brush tool of FIG. 7;

FIG. 9 shows a bottom view of the brush tool of FIG. 7;

FIG. 10 shows a detail on an enlarged scale and with cut away portions of the brush tool of FIG. 7;

FIG. 11 is a front elevation view with cut-away portions of a injection moulding press portion for manufacturing the brush tool of FIG. 7;

FIG. 12 is a bottom view similar to that of FIG. 7, but showing a brush tool attached to a support socket;

FIG. 13 shows a side view of the brush tool of FIG. 12;

FIG. 14 is a top schematic view of another embodiment of the brush tool according to the present invention, and FIG. 15 shows a side view of the brush tool of FIG. 14 with its respective support socket.

DETAILED DESCRIPTION OF THE PREFERRED EMBODIMENTS

Figure 4:
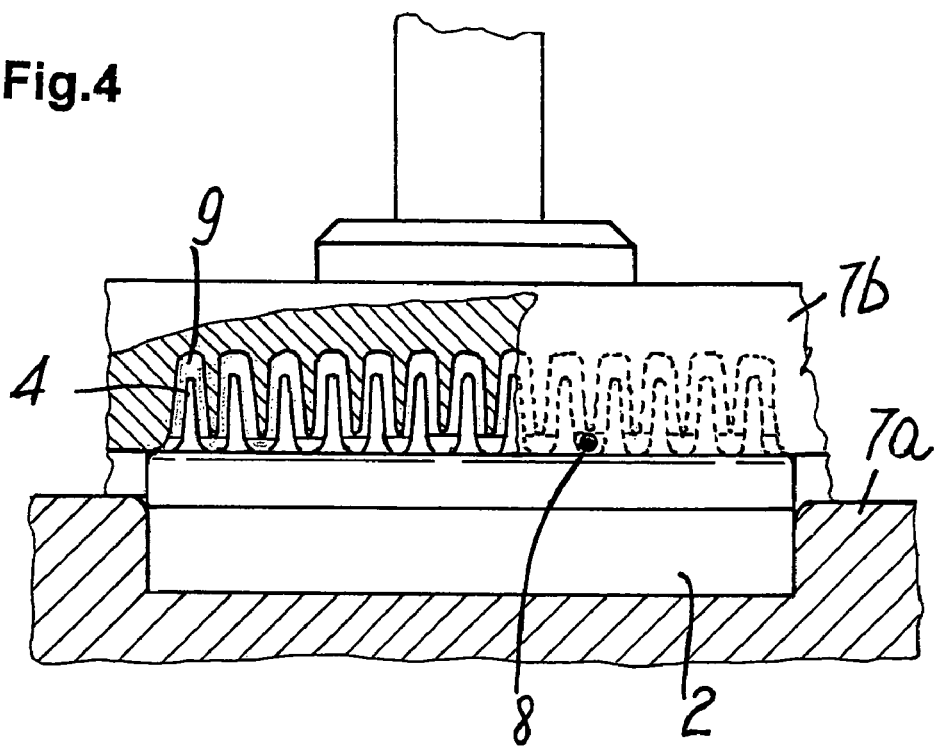
FIG. 4 shows a front elevation view with cut away portions of an injection moulding press portion for applying a coating layer or cover on the cores or dummy bristles of the support socket shown in FIG. 1.
Figure 5:
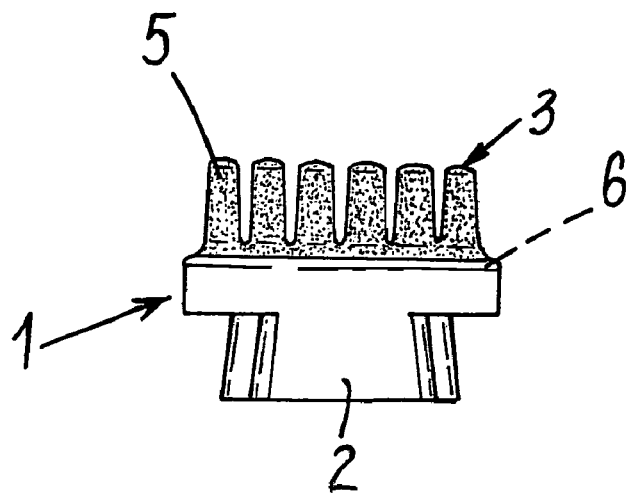
FIG. 5 is a side view similar to that of FIG. 3, but showing a finished brush, i.e. having internal cores covered with a coating layer containing grain abrasive material.

With reference first to FIGS. 1 to 6, it will be noted that a brush tool generally designed as 1 according to the present invention comprises a base member or support socket 2 and a plurality of bristle members 3, each having a core o dummy bristle 4 of mouldable synthetic material projecting from a surface 2a of the socket member 2. On each core or dummy bristle 4 there is applied, as a cover, an external coating 5 of mouldable thermoplastic material, e.g. by injection moulding, including grains of one or more abrasive materials dispersed therein.

As mentioned above, the support socket 2 is preferably obtained by moulding of a suitable mouldable thermoplastic material. For example, it can be obtained by a suitable hot moulding process of any suitable type, integral with the cores 4, or the latter can be separately produced also in a material different from that employed for the support socket member. Preferably, the cores 4 are integral with a base portion 6 and extend from a surface 6a thereof. Such a base portion 6 is designed to be subsequently anchored or otherwise secured to the support socket 2 to form together with it one brush block, typically for application to a multiple tool head of a tool machine (smoothing machine).

The support socket 2 together with cores 4 is then placed into a mould 7a, 7b, in which a suitable injectable thermoplastic material is hot injected including grains of at least one abrasive material, as described above. The thermoplastic material is injected at a suitable pressure and temperature, e.g. through one ore more injection ports 8 in fluid communication with an uninterrupted gap 9 which is delimited between internal cores 4 and mould 7b.

With this operation, all cores or dummy bristles 4 and preferably also the surface 2a of the socket member, from which cores project substantially parallel to one another are covered with a coating layer 5, which, besides containing one or more particle abrasive materials, can also include one or more filling materials, e.g. glass fibers or glass balls, steel powder, and the like, as described above.

Materials for both cores 4 and external coating cover 5 are selected and dosed in order to obtain generally rather rigid bristles 3, although with various degree of flexibility within not too wide limits, and provided with specific abrasive characteristics depending upon the type of the material to be worked.

With reference to FIGS. 7 to 13, it will be noted that a brush tool 100 according another embodiment of the present invention comprises a base portion 160 having a surface 160a, from which a plurality of different size bristle members 130 project. Bristles 130 are arranged in an alternate and offset arrays of relatively thick bristles 130a and thinner bristles 130b, so as to alternate bristles with different flexibility and thus to impart the brush tool as a whole a controlled flexibility.

The base portion 160 also comprises a further attachment surface or surfaces 160b located at the opposite side with respect to the surface 160a and arranged to make a shape coupling with a support socket 120, which is preferably obtained by moulding a suitable mouldable thermoplastic material, as conventional in the art.

As shown in FIG. 11, to obtain a brush tool 100 a male mould 170b and a female mould or die 170a are used, which, in use, delimit a multiple cavity 190, in which a suitable thermoplastic material is injected including at least one abrasive material therein, as described above. The thermoplastic material is injected at a suitable pressure and temperature, e.g. through one ore more injection ports 180 communicating with the moulding cavity 190. With this structure, a base portion 160 and a plurality of differently sized bristle members 130a and 130b projecting therefrom and integral with the base portion 160 (FIG. 10) is obtained after moulding.

In FIGS. 14 and 15, a further embodiment of the brush tool according to the present invention is shown, which comprises bristle members 130 all having the same dimensions (height and size).

Advantageously, a further moulding operation of a mouldable material, e.g. an injection mouldable material, can be provided including grains of at least one abrasive dispersed therein to obtain, e.g. at alternate zones with respect to those provided with bristles 130, further bristles also projecting from the supporting base or support socket, but having features that differ from those of the plurality of bristles, e.g. grain size or type of added abrasive material and/or size of the bristles thus obtained.

Advantageously, a brush tool according to the present invention can have various configurations and shapes, e.g. parallelepiped blocks, circular sector blocks both having a flat or preferably cylindrical working front, etc. depending upon the aimed use as it is known in the block polishing and lapping technique.

The above described system is susceptible to numerous modifications and variations within the scope as defined by the claims.

Thus, for example a coating coat can be advantageously applied which includes one or more abrasive grain materials on both cores not including abrasive material therein, as above described, and cores comprising at least one abrasive material therein to obtain layered bristles with layers having different abrasion characteristics, e.g. a different gain size of the used abrasive material or materials or different nature of the abrasive material or materials included therein, in order to graduate the abrasive characteristics of the brush tool depending upon the intended surface working operations.

The invention claimed is:

1. A method for producing a surface roughing, polishing, and smoothing brush for stone material, comprising the following steps:
    a first injection molding of a core mixture including at least one moldable synthetic material in a mold, to obtain a base portion of a brush and a plurality of dummy bristles absent abrasive materials projecting from at least one surface of said base portion, said dummy bristles being tapered from their base end to their tip end;
    a second injection molding over the entire surface of said dummy bristles and all surfaces connecting, between, and contiguous with said dummy bristles, an abrasive coating layer material comprising a thermoplastic resin and a granular abrasive material, forming a plurality of finished bristle members which are tapered from their base end to their tip end, said finished bristle members comprising said dummy bristles as a core, and an abrasive molded on coating layer.

2. A method as claimed in claim 1, wherein said thermoplastic resin comprises polyamide.

3. A method as claimed in claim 1, wherein said core mixture comprises a suitable moldable synthetic material, selected from the group including olefin polymers, styrene or vinyl chloride or vinyl acetate copolymers, polyvinyl ether, polyacrylate resins, linear polyamides, mixed polyamides and polyamine products, polyamides (PA), polymethacrylamide, polyamide-imide, polyether-imide, thermoplastic polyurethane polymers, crystallizing PA masses, amorphous polyamides, flexible PA copolymers, flexible thermoplastic polyurethane elastomers (TPU), polyolefins, such as polyethylene, ethylene, polipropylene, polybutylene-1, polymethylpentene copolymers or styrene polymers, vinyl chloride polymers, such as PVC, fluoridised polymers, plastic poly(meta) acrylic materials, PMMA (polymethylmethacrylate) molding masses, polycarbonate, polyalkylene terephthalates (PTP), polyarylates, oxides-sulfides (PPS)-linear sulforic polyacrylics, polyphenyleneoxide mod. (PPO), polyarylethere (ketone, polysulfones (PEEK)) and mixtures thereof.

4. A method as claimed in claim 1, wherein said plurality of finished bristle members comprise bristle members having at least two different orders of size.

5. A method as claimed in claim 1, wherein said base portion is shaped as a support socket member arranged to act as a direct attachment component to a tool head of a tool machine.

6. A method as claimed in claim 1, wherein said base portion is securable to a support socket member arranged to act as an attachment means to a tool head of a tool machine.

7. A method as claimed in claim 1, comprising a third injection molding of a moldable material including grains of at least one abrasive dispersed therein to obtain a multiplicity of additional bristle members projecting from said base portion and having flexibility characteristics that differ from those of said plurality of bristle members.

8. A method as claimed in claim 1, wherein said at least one abrasive material comprises abrasive grains embedded in a matrix comprising at least one thermoplastic resin and at least one filling component.

9. A method as claimed in claim 8, wherein said thermoplastic resin is selected from the group comprising polyamide, polypropylene, polyphenylene sulfide and polyester-based thermoplastic material.

10. A method as claimed in claim 8, wherein said at least one filling component is selected from the group comprising glass particles, glass balls, glass fibers, talc and stainless steel powder.

11. A method as claimed in claim 1, wherein said at least one abrasive granular material is selected from the group comprising silicon carbide, dark red corundum, tungsten carbide, diamond, boron carbide, white corundum, aluminum oxides (aluminas), chromium corundum, quartz, silica, and metal grits including at least one of the following metal materials: steel, bronze, cupper, cobalt, magnesium, tungsten, and titanium.

12. The method of claim 1, wherein the core mixture of the dummy bristles and the abrasive coating layer material are selected to achieve the desired degree of flexibility to adapt to the surfaces to be treated.

13. The method of claim 12, wherein the dummy bristles are arranged in alternate and offset arrays of relatively thick bristles and thinner bristles so as to alternate bristles with different flexibility.

14. The method of claim 1, wherein the dummy bristles comprise Nylon 6 filled with glass fibers and the abrasive coating layer comprises Nylon 6 filled with glass fibers and silicone carbide or Nylon 6 filled with dark red corundum.

15. The method of claim 1, wherein the base portion and the dummy bristles comprises polypropylene filled with talc and the abrasive coating layer comprises Nylon 6 filled with silicone carbide.

16. The method of claim 1, wherein the base portion and dummy bristles comprise polyphenylene sulfide filled with glass fibers and stainless steel powder and the abrasive coating layer comprises Nylon 6, silicon carbide tungsten carbide.

17. The method of claim 1, wherein the base portion and dummy bristles comprise polyphenylene sulfide filled with glass fibers and stainless steel powder and the abrasive coating layer comprises Nylon 6 filled with diamond.

* * * * *